(12) United States Patent
Andreussi et al.

(10) Patent No.: US 8,636,857 B2
(45) Date of Patent: Jan. 28, 2014

(54) METHOD TO OBTAIN A MANGANESE STEEL ALLOY

(75) Inventors: Alberto Andreussi, Tricesimo (IT); Primo Andreussi, Reana del Rojale (IT); Enrico Veneroso, Udine (IT); Eddy Pontelli, Tricesimo (IT)

(73) Assignee: F.A.R.—Fonderie Acciaierie ROIALE SpA, Reana del Rojale (IT)

( * ) Notice: Subject to any disclaimer, the term of this patent is extended or adjusted under 35 U.S.C. 154(b) by 0 days.

(21) Appl. No.: 11/792,726

(22) PCT Filed: May 12, 2005

(86) PCT No.: PCT/EP2005/052169
§ 371 (c)(1),
(2), (4) Date: Jun. 6, 2007

(87) PCT Pub. No.: WO2006/061261
PCT Pub. Date: Jun. 15, 2006

(65) Prior Publication Data
US 2007/0292299 A1 Dec. 20, 2007

(30) Foreign Application Priority Data
Dec. 6, 2004 (IT) .............................. UD2004A0228

(51) Int. Cl.
*C22B 1/00* (2006.01)
*C21C 7/072* (2006.01)
*C22C 38/04* (2006.01)

(52) U.S. Cl.
USPC ............... 148/619; 148/540; 75/401; 75/533; 75/538; 75/568; 75/569

(58) Field of Classification Search
USPC ......... 420/74, 75; 148/327, 619, 620; 75/533, 75/538, 568, 569, 401
See application file for complete search history.

(56) References Cited

U.S. PATENT DOCUMENTS

| 3,330,651 | A | * | 7/1967 | Younkin | 420/75 |
| 3,729,309 | A | * | 4/1973 | Kawawa | 420/126 |
| 4,394,168 | A | * | 7/1983 | Hartvig et al. | 420/74 |
| 4,512,804 | A | | 4/1985 | Kos | |
| 4,531,974 | A | * | 7/1985 | Kos | 420/73 |
| 4,975,335 | A | * | 12/1990 | Wan | 428/610 |
| 5,308,408 | A | * | 5/1994 | Katila | 148/328 |
| 5,391,348 | A | * | 2/1995 | Soofi | 420/129 |

FOREIGN PATENT DOCUMENTS

| EP | 0 136 433 A | | 7/1984 |
| JP | 355006428 | * | 1/1980 |
| JP | 355122818 | * | 9/1980 |
| JP | 60-36647 | * | 2/1985 |
| JP | 08-225820 A | | 9/1996 |
| JP | 10-130714 A | | 5/1998 |

OTHER PUBLICATIONS

English-hand translation of Japanese patent 360036647, Sasaki et al., Feb. 25, 1985.*
Steelmaking Practices and Their Influence on Properties, B, Mishra, Department of Metallurgical & Materials Engineering, Colorado School of Mines,http://products.asminternational.org, ASM, 2004.*
B. Mishra, Steelmaking Practices and Their Influence on Properties, Metals Handbook Desk Edition, $2^{nd}$ ed., ASM International, 1998.*
Steelmaking Practices and Their Influence on Properties, B. Mishra, Department & Materials Engineering, Colorodo School of Mines, http://products.asinternation.org, ASM, 2004.*

* cited by examiner

*Primary Examiner* — Deborah Yee
(74) *Attorney, Agent, or Firm* — Flaster/Greenberg P.C.

(57) ABSTRACT

A method to obtain a manganese steel alloy having a percentage weight of carbon varying from about 0.5% to about 2%, a percentage weight of manganese varying from about 10% to about 20%, and a percentage weight of titanium varying from about 0.01% to about 5%. The method comprises at lest a step wherein a determinate quantity of steel scrap with manganese or steel scrap with carbon is melted in order to define a metal bath, a step wherein, in order to deoxidize the metal bath a determinate percentage weight of aluminum is added, a step wherein a determinate percentage weight of nitrogen is added, a step wherein a determinate percentage weight of titanium is added, and a step wherein the metal bath is cast at a determinate temperature.

7 Claims, No Drawings

METHOD TO OBTAIN A MANGANESE STEEL ALLOY

BACKGROUND OF THE INVENTION

1. Field of the Invention

The present invention concerns a method to obtain a manganese steel alloy, also known as "Hadfield steel", amagnetic, with an austenite structure, extremely tough and able to harden if subjected to repeated impacts and/or knocks. The steel alloy is normally used in applications where a high resistance to abrasive wear is required, such as for example in the industry to extract, process, grind, crush, riddle or suchlike, inert materials, stone, iron alloys or other.

2. Description of Related Art

A manganese steel alloy is known, whose properties were studied as far back as 1882 by R. A. Hadfield, who understood that a steel alloy with a percentage weight of manganese comprised between about 7% and about 20% is able to harden on the surface, that is, to create an extremely hard surface film which gives the alloy an optimum resistance to abrasion.

This manganese steel alloy, also known as Hadfield steel, represents the basic quality from which subsequently all the modifications of chemical composition were made, in order to make the use of this type of alloy more versatile. In fact, the prerogative of its resistance to abrasion is the development of the hardened layer which is generated through repeated impacts, that is, by means of cold plastic deformation.

One of the most important modifications to conventional manganese steel alloy is the introduction of chromium in different percentages of weight, which allows to obtain a harder austenitic matrix, and hence to use this type of alloy also in applications where the entity of the impacts are not such as to allow an optimum surface hardening of the alloy. By increasing the percentage of chromium it is possible to obtain on board and inside the austenite grain, after particular heat treatments, controlled an isolated precipitations of mixed carbides of chromium of a rounded form, which represent hard points such as to impede the mechanism of abrasive wear.

It must be observed that if the manganese steel alloy is subjected to slow cooling, which is the typical case of cooling that occurs in the flask after casting, it has a not completely austenitic structure, but one characterized by the presence of precipitates of pearlite and mixed carbides that continuously follow the edge of the austenitic grain. The presence of these islands on board the austenitic grain makes the material fragile and hence does not allow use of the steel alloy as it is cast.

A solution heat treatment is therefore necessary, that is, to heat the steel to a temperature comprised between 1000-1200° C. and subsequently to quench it drastically in water.

This treatment allows a solution heat treatment of the carbides and of the precipitated pearlite, giving a great toughness to the material thus treated.

In the case of manganese steel alloys with parts of chromium, however, the precipitation of carbides mixed with chromium on board the austenitic grain makes it necessary to perform solution heat treatments with controlled temperatures and according to heating duration times that are difficult to determine.

In fact, a competition is created between the time needed for the solution heat treatment of the carbides and the kinetics of the swelling of the austenitic grain, which latter phenomenon has to be contrasted so as not to negatively influence the alloys' properties of resistance to abrasion.

The problem of the solution heat treatment of the carbides is emphasized in the case of artifacts with thicknesses of more than 100 mm, since breakages may occur inside the material, during the quenching treatment in water, due to the presence of fragile zones which are not able to support the dilations due to the heat treatment.

In fact, the quenching means is not sufficient to allow rapid cooling also inside the section of the artifact, thus creating dangerous re-precipitations of carbides mixed with chromium which, in the subsequent cooling stages, make the austenitic structure excessively fragile.

It is also known that the strengthening of metal alloys is generally given by non-deformable particles present inside the crystal structure, that is, incoherent particles which do not allow themselves to be crossed by dislocations and which therefore increase the speed of hardening of a metal material, for example what happens in the process of ageing copper-aluminum alloys.

It is also known that an excess of aluminum and nitrogen in manganese steel alloys is deleterious for the structural solidity of the artifact, since the appearance of aluminum azides which are disposed on board the austenitic grain make the alloy fragile.

It is also known from the U.S. Pat. No. 4,531,974 to obtain manganese austenitic steel having a possible percentage weight of titanium comprised between 0.0% and 0.2% and a possible percentage weight of zirconium comprised between 0.0% and 0.05%.

BRIEF SUMMARY OF THE INVENTION

A purpose of the present invention is to perfect a method to achieve a manganese steel alloy which allows an optimum and simple solution heat treatment, in order to determine an increase in the resistance to wear.

The Applicant has devised, tested and embodied the present invention to overcome the shortcomings of the state of the art and to obtain these and other purposes and advantages.

The present invention is set forth and characterized in the main claims, while the dependent claims describe other characteristics of the invention or variants to the main inventive idea.

In accordance with the above purpose, a method according to the present invention to obtain a manganese steel alloy provides, in a substantially conventional manner, at least a first step to melt a determinate quantity of manganese steel scrap or carbon steel scrap, by means of melting means, for example of a rotary type, in order to define a metal bath; a possible second step wherein, to deoxidize the metal bath, a determinate percentage of aluminum is added; and a third step wherein the metal bath thus obtained is cast, for example into a flask, at a determinate temperature, in order to achieve a desired artifact.

According to a characteristic feature of the present invention, the method also comprises, between the second and the third step, a fourth step wherein a determinate percentage weight of nitrogen is added to the metal bath, in order to increase the percentage of nitrogen, and a fifth step wherein a determinate percentage weight of a titanium iron alloy is added to the metal bath, in order to reach the desired chemical composition.

According to a variant of the present invention, the said second step can be eliminated, since a percentage of aluminum is in any case contained in the titanium iron alloy introduced during said fifth step.

Moreover, according to another variant, the method can provide, between said first and second step, a sixth step wherein a determinate percentage weight of manganese, chromium and/or an iron alloy that contains them, is added to the metal bath, in order to obtain desired chemical characteristics of the metal bath.

The manganese steel alloy obtained with the method according to the present invention has a percentage weight of carbon that varies from about 0.5% to about 2%, a percentage weight of manganese that varies from about 10% to about 20% and a percentage weight of titanium that varies from about 0.3% to about 5%, so as to contribute to increase the resistance to wear.

To be more exact, the structure of the alloy according to the invention is composed of an austenitic matrix with the dispersion of intermetallic particles, which are identifiable as mixes containing at least titanium, nitrogen and carbon combined together.

Moreover, the alloy comprises, according to an advantageous preferential embodiment, a percentage weight of nitrogen that varies from about 0.001% to about 0.10%, and a percentage of chromium that varies from about 0.01% to about 10%.

Therefore, by exploiting the known capacity of titanium to alloy with carbon and/or nitrogen to form very fine and extremely stable precipitates, known by the terms of carbonitrates or nitrates which have a cubic morphology that disperses in the metal matrix, it is possible, for example, to delay the growth of the austenitic grain of the alloy during solution heat treatment, and refine the structure thereof in the microalloyed carbon steels.

This possibility allows to create barriers against the propagation of dislocations inside the metal matrix, hence allowing the material to harden easily.

DETAILED DESCRIPTION OF THE INVENTION

According to a preferential form of embodiment, the method to obtain a manganese steel alloy according to the present invention provides a series of steps intended to facilitate the formation of carbonitrates and titanium nitrates, on the contrary limiting the formation of aluminum nitrates. The manganese steel alloy thus obtained, inside the austenitic structure, has a plurality of hard precipitates, at least consisting of titanium, carbon and nitrogen, which contribute to increase its resistance to the abrasive action in the field of use mentioned.

Said hard precipitates have great stability, even at high temperatures, and do not enter into solution with the austenite during the solution heat treatment, making the heat treatment itself more versatile and preventing re-precipitations on board the austenitic grain even in the manufacture of artifacts with great thicknesses.

In the following description indicative values will be given in weight for the quantity of the various components used to obtain the manganese steel alloy according to the invention. Said values are referred to the specific obtaining of about 100 kg of said steel alloy.

To be more exact, the method according to the invention provides initially, in a known manner, to melt a determinate quantity of manganese steel scrap or carbon steel scrap and refined cast iron, for example by means of a rotary furnace fed by gas oil/oxygen or carbon/oxygen, to define a liquid bath.

The following Table indicates the preferential values of weight and the percentages of the relative chemical compositions of the components of the scrap from which the liquid bath is obtained.

|  | Chemical composition | | |
| --- | --- | --- | --- |
| TYPE OF SCRAP | % C | % Mn | Weight (kg) |
| Common scrap | 0.3 | 0.5 | 390 |
| Scrap Mn 12% | 1.2 | 12 | 490 |
| FeMn Mn 45% | 4.5 | 45 | 78 |

Once the liquid bath has been obtained, chemical analyses are repeatedly performed thereon and, optionally, desired percentages P4 in weight of manganese are added, in order to reach analytically an optimum chemical composition of the liquid bath.

The percentage P4 varies according to the type of scrap used to make the liquid bath, that is, it can be 0, if the scrap already contains a sufficient percentage weight of manganese, or it can even be as much as about 10%, if the percentage of manganese in the scrap used in very low.

In this case, given the requirements of use of the steel alloy to be obtained, a determinate percentage weight P5 of chromium is also added to the liquid bath.

This percentage P5 of chromium is also variable according to the type of scrap used. Generally speaking, the percentage P5 of chromium varies from about 0.001% to about 10%.

An example of percentage weights of the chemical components resulting from a chemical analysis made on the liquid bath is shown in the following Table:

| % C | % Mn | % Si | % Cr | % Ti | % Al | % N |
| --- | --- | --- | --- | --- | --- | --- |
| 1.10 | 8.00 | 0.30 | 0.5 | 0 | 0 | 0.0100 |

In this example, the addition of manganese to the metal bath is effected by adding manganese iron alloys having the following characteristics:

|  | Chemical composition | | |
| --- | --- | --- | --- |
| TYPE OF IRON ALLOY | % C | % Mn | Weight (kg) |
| Carburized FeMn | 6.7 | 76 | 13 |
| FeSiMn | 1.6 | 65 | 67 |

With regard to the addition of chromium to the metal bath, in this example an iron alloy with the following characteristics is used:

|  | Chemical composition | | |
| --- | --- | --- | --- |
| TYPE OF IRON ALLOY | % C | % Cr | Weight (kg) |
| Carburized FeCr | 8 | 65 | 10 |

As can be seen from the Tables, also according to the final quantity (1000 kg) of manganese steel alloy to be obtained, a percentage weight P4 of manganese is therefore added that is equal to about 5.34% and a percentage weight P5 of chromium equal to about 0.62%.

Once the desired values of chemical composition of the liquid bath have been analytically reached, the latter is deoxidized by means of adding a percentage weight P1 of aluminum during the tapping into the ladle.

In this case, at the moment of tapping into the ladle, pure aluminum equal to about 0.01% in weight and FeSi equal to about 0.3% in weight are added, as indicated in the following Table.

| TYPE OF IRON ALLOY | Weight (kg) |
|---|---|
| Al 99% | 0.1 |
| FeSi | 3 |

During tapping, nitrogen is added in the ladle. In the example a percentage weight P2 of about 0.0054% of nitrogen is introduced, by using a nitrogenous manganese alloy, in order to increase the percentage thereof. The nitrogenous manganese is advantageously added to the ladle according to the value shown in the following Table:

| TYPE OF IRON ALLOY | Weight (kg) |
|---|---|
| Nitrogenous Mn (6% N) | 0.9 |

When tapping is completed, a percentage weight P3 of about 0.655% of titanium is added in the ladle, in order to reach the desired chemical composition of the liquid bath. In this case, a quantity of titanium iron alloy is introduced equal to about:

| TYPE OF IRON ALLOY | Weight (kg) |
|---|---|
| FeTi | 9.5 |

Once the titanium iron alloy has been introduced into the liquid bath, an injection of argon is performed.

The liquid bath thus obtained is cast into the flask at a temperature T varying from about 1450° C. to about 1410° C., after an injection of argon gas under the slag.

The manganese steel alloy thus obtained, according to a preferential form of embodiment, has the following chemical composition:

| % C | % Mn | % Si | % Cr | % Ti | % Al | % N |
|---|---|---|---|---|---|---|
| 1.20 | 12.00 | 0.50 | 1.00 | 0.5 | 0.012 | 0.0150 |

The analysis reported takes into account the performance of the iron alloys used, the losses due to the level of oxidation of the metal bath during processing in the furnace and the metallurgical conditions of the bath itself.

It is clear, however, that modifications and/or additions of steps may be made to the method as described heretofore, without departing from the field and scope of the present invention.

For example, it also comes with in the field of the present invention to provide that, according to the specific functional requests, the manganese steel alloy according to the invention can contain desired percentages in weight of other components such as for example tungsten, vanadium, molybdenum or other metals, normally used in metallurgy to give the alloy desired physical and mechanical characteristics.

It is also clear that, although the present invention has been described with reference to specific examples, a person of skill in the art shall certainly be able to achieve many other equivalent forms of method to obtain a manganese steel alloy, and manganese steel alloy thus obtained, having the characteristics as set forth in the claims and hence all coming within the field of protection defined thereby.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method to obtain a steel alloy comprising
   at least a first step wherein a determinate quantity of manganese steel scrap or carbon steel scrap is melted in a furnace in order to define a metal bath,
   a possible second step wherein, in order to deoxidize said metal bath, a determinate percentage weight of aluminum is added to said metal bath during tapping into the ladle, and
   a third step wherein said metal bath is cast at a determinate casting temperature,
   wherein, between said second step and said third step, at least a fourth step is also provided during tapping into the ladle wherein a second determinate percentage weight of nitrogen is added to said metal bath, and wherein between said second step and said third step, in addition to said fourth step, a fifth step is provided when tapping is completed wherein a third percentage weight of titanium is added to said metal bath in the ladle, comprised between about 0.3% and about 5% and once the titanium has been introduced into the metal bath, an injection of argon gas is performed,
   wherein before said third step of casting, a further injection of argon gas under the slag is performed in the metal bath in the ladle.

2. The method of claim 1, wherein said determinate percentage weight of manganese iron alloy varies from about 1% to about 20%.

3. The method of claim 1, wherein said iron alloy is a chromium iron alloy and said chromium iron alloy comprises at least a percentage weight of chromium.

4. The method of claim 3, wherein said determinate percentage weight of said chromium iron alloy varies from about 0.001% to about 10%.

5. The method of claim 1, wherein said first determinate percentage weight of said aluminum varies from about 0.005% to about 0.035%.

6. The method of claim 1, wherein said second determinate percentage weight of nitrogen varies from about 0.0001% to about 0.10%.

7. The method of claim 1, wherein said determinate casting temperature varies from about 1500° C. to about 1410° C.

* * * * *